United States Patent
Nakajima et al.

(10) Patent No.: US 6,576,023 B2
(45) Date of Patent: Jun. 10, 2003

(54) METHOD AND APPARATUS FOR MANUFACTURING MICROSPHERES

(75) Inventors: Mitsutoshi Nakajima, Ibaraki (JP); Hiroyuki Fujita, Tokyo (JP); Yuji Kikuchi, Ibaraki (JP); Isao Kobayashi, Gunma (JP)

(73) Assignees: Japan as represented by Director of National Food Research Institute, Ministry of Agriculture, Forestry and Fisheries, Ibaraki (JP); Bio-Oriented Technology Research Advancement Institution, Tokyo (JP)

( * ) Notice: Subject to any disclaimer, the term of this patent is extended or adjusted under 35 U.S.C. 154(b) by 284 days.

(21) Appl. No.: 09/791,085

(22) Filed: Feb. 22, 2001

(65) Prior Publication Data

US 2002/0043731 A1 Apr. 18, 2002

(30) Foreign Application Priority Data

Oct. 13, 2000 (JP) ........................................ 2000-313577

(51) Int. Cl.[7] .............................. B01J 13/02; B29J 9/00
(52) U.S. Cl. ............................. 264/14; 264/5; 264/11; 264/12; 425/6; 366/176.1
(58) Field of Search ..................... 264/5, 11, 12, 264/13, 14; 425/6, 7; 366/176.1

(56) References Cited

U.S. PATENT DOCUMENTS

| | | | |
|---|---|---|---|
| 3,747,759 A | | 7/1973 | Olgard et al. |
| 4,000,086 A | * | 12/1976 | Stoev et al. ................ 516/53 |
| 4,201,691 A | | 5/1980 | Louderback |
| 4,533,254 A | | 8/1985 | Cook et al. |
| 5,063,002 A | * | 11/1991 | Luker ........................... 264/12 |
| 5,247,957 A | | 9/1993 | Weisse |
| 5,326,484 A | | 7/1994 | Nakashima et al. |
| 5,626,751 A | * | 5/1997 | Kikuchi et al. |
| 5,730,187 A | | 3/1998 | Howitz et al. |
| 5,842,787 A | | 12/1998 | Kopf-Sill et al. |
| 5,904,424 A | | 5/1999 | Schwesinger et al. |
| 6,155,710 A | * | 12/2000 | Nakajima et al. |
| 6,177,479 B1 | | 1/2001 | Nakajima et al. |

FOREIGN PATENT DOCUMENTS

| | | |
|---|---|---|
| JP | 54-116389 | 9/1979 |
| JP | 60-5223 | 1/1985 |
| JP | 2-954433 A | 4/1990 |
| JP | 5-220382 A | 8/1993 |
| JP | 6-71150 A | 3/1994 |
| JP | 6-315617 A | 11/1994 |
| JP | 9-225291 A | 9/1997 |
| WO | WO97/30783 * | 8/1997 |

OTHER PUBLICATIONS

K. Fujinawa, T. Maruyama, Y. Nakaike: "A Study On Drop Formation In Liquid–Liuid System", *Kagaku Kogaku*, vol. 21, No. 4, pp. 194–201 (1957).

(List continued on next page.)

*Primary Examiner*—Mary Lynn Theisen
(74) *Attorney, Agent, or Firm*—Carrier, Blackman & Associates, P.C.; Joseph P. Carrier; William D. Blackman

(57) ABSTRACT

A method and an apparatus are provided for efficiently manufacturing microspheres having a uniform particle diameter. The apparatus comprises: case 1 having a lower body 1a and an upper body 1b. A seal ring 3, a first plate 4 which is comprised of a transparent plate such as a glass plate or a plastic plate, an annular spacer 5, an intermediate plate 6 which is comprised of a silicon substrate or the like, an annular spacer 7, a second plate 8 and a seal ring 9 are inserted in this order into a concave portion 2 formed in the lower body 1a. The upper body 1b is superposed thereon. Further, the upper body 1b is attached to the lower body 1a with bolts or the like.

16 Claims, 5 Drawing Sheets

OTHER PUBLICATIONS

E.S.R. Gopal: "Science Of Emulsions", *Asakura–shoten* (1971).

F. Olson. C.A. Hunt, F.C. Szoka, W.J. Vail, D. Papahadjo-Poulos: "Preparation Of Liposomes Of Defined Size Distribution By Extrusion Through Polycarbonate Membranes", *Biochimica et Biophysica Acta*, 557, pp. 9–23, Elsevier/ North–Holland Press (1979).

"Method Of Using Repeated Filtrations Through A PTFE Membrane", *Proceedings Of The 26th Autumn Meeting Of The Society Of Chemical Engineers*, p. 243 (1993).

T. Kawakatsu, Y. Kikuchi, M. Nakajima: "Regular–Sized Cell Creation In Microchannel Eulsification By Visual Microprocessing Method", *The Journal Of The American Oil Chemists'Society*, vol. 74, No. 3, pp. 317–321, AOCS Press (1997).

* cited by examiner (a)     (b)     (c)     (d)     (e)

METHOD AND APPARATUS FOR MANUFACTURING MICROSPHERES

BACKGROUND OF THE INVENTION

1. Field of the Invention

The present invention relates to a method and an apparatus for manufacturing emulsions for use in food, drugs, cosmetics or the like, emulsions for DDSs (Drug Delivery Systems), and microspheres (fine particles) which are solid fine particles or liquid fine particles used as a microcapsule, an ion exchange resin, a chromatography carrier or the like.

2. Description of the Relevant Art

Techniques in which a biphasic system, for which a separated state is thermodynamically stable, is formed, such as that composed of a water phase and an organic phase which are emulsified to obtain a semi-stable emulsion, are conventionally known.

As general emulsification methods, there have been described in "Science of Emulsions" (Asakura-shoten, 1971), the methods of using a mixer, a colloid mill, a homogenizer, etc., and the method of dispersion with sound waves, which are all well known.

The general methods mentioned above have a disadvantage in that the diameters of dispersed phase particles in a continuous phase are distributed over a wide range.

Therefore, a method of using filtration by means of a membrane comprising polycarbonate (Biochemica et Biophysica Acta, 557 (1979), North Holland Biochemical Press); a method using repeated filtrations through a PTFE (polytetrafluoroethylene) membrane (Proceedings of the 26th Autumn Meeting of the Society of Chemical Engineers, Japan, 1993); and a method of manufacturing homogenous emulsions by transferring a dispersed phase into a continuous phase through a porous glass membrane having uniform pores (Japanese Patent Application Laid-Open No. 2-95433) have been proposed. In addition, as a method of manufacturing emulsions using a nozzle or a porous plate, a laminar-flow dripping method (KAGAKU KOOGAKU Vol. 21, No. 4, 1957) is also known.

The method using filtration through a membrane comprising polycarbonate and the method using repeated filtrations through a PTFE membrane theoretically cannot manufacture emulsions comprising particles larger than the membrane pores and cannot separate particles smaller than the membrane pores. These methods are therefore especially unsuitable for producing emulsions comprising large particles.

In the method using a porous glass membrane having uniform pores, when the average diameter of the membrane pores is small, particle diameters are distributed in a narrow range and thus homogenous emulsions can be obtained. When the average diameter of the membrane pores is increased, however, particle diameters become distributed over a wide range so that homogenous emulsions cannot be obtained.

In addition, in the laminar-flow dripping method, particle sizes become 1,000 μm or more and are distributed over a wide range so that homogenous emulsions cannot be obtained.

Therefore, the inventors of the present invention formerly proposed an apparatus which can continuously produce homogenous emulsions in International Publication No. WO97/30783. The structure of this apparatus is shown in FIGS. 8 and 9. FIG. 8 is a vertical sectional view of this apparatus. FIG. 9 shows a perspective exploded view wherein a base and a plate are shown taken apart. In this apparatus for producing emulsions, a supply port 102 for a continuous phase, a supply port 103 for a dispersed phase, and a withdrawal port 104 for emulsions are formed in a body 101 supported by a case 100. A bulkhead member 106 provided between the body 101 and a base 105 separates the supply port 103 for a dispersed phase from the withdrawal port 104 for emulsions. In addition, an opening 107 for a dispersed phase is formed in the center part of the base 105 and a gap is formed between the base 105 and a plate 108 placed opposite the base 105. The dispersed phase and the continuous phase are separated in a boundary section 109 formed in the base 105 and the dispersed phase and the continuous phase are mixed in a microchannels 110 formed in the boundary section 109.

The dispersed phase supplied to the inside of the bulkhead member 106 through the supply port 103 enters a gap between the plate 108 and the base 105 through the opening 107. The dispersed phase then enters the continuous phase through the microchannel 110, and thereby emulsions are formed.

As an art related to producing microspheres (fine particles) other than in emulsions, there is known a spray drying method. Spray drying method may be of three types, i.e., a centrifugal nozzle method, a pressure nozzle method and a two-fluid nozzle method. However, in each method, a turbulent flow is formed by rotating a nozzle at high speed or making a liquid flow at high speed, and the liquid is caused to form microspheres (fine particles) through a shear stress caused by the turbulent flow.

As an apparatus for manufacturing microspheres, there is also known a granulation apparatus. Granulation apparatuses of many types are known, for example: a pumping type, a centrifugal flow type, a fluidized bed type, an air current type, a stirring type or the like. However, in methods employing each of these types of granulation apparatus, microspheres (liquid drops) are formed through a shear stress caused by a turbulent flow.

In the conventional apparatus for producing emulsions, the spray dryer or the various granulation apparatuses as mentioned above, a penetrating hole of a porous membrane or a nozzle from which microspheres are pumped has a circular shape or a nearly circular shape with respect to the opening shape.

In the case where the opening shape of the portion from which the dispersed phase is pumped into the continuous phase is circular or nearly circular, since the force of a vertical direction uniformly acts on the boundary surface of the dispersed phase which is pumped from the opening, the dispersed phase is difficult to separate from the opening. Therefore, in the conventional arts, as mentioned above, a turbulent flow is formed, the dispersed phase is forced to separate from the opening through a shear stress caused by the turbulent flow, and thereby fine particles are produced.

However, in the case where microspheres (fine particles) are formed through a shear stress caused by the turbulent flow, since the dispersed phase is difficult to separate from the opening as liquid drops as mentioned above, the problem arises wherein the particle diameters of the manufactured microspheres are not uniform.

In the known apparatus in relation to, as well as particle diameter, there is another problem that relates to production efficiency. For example, in the apparatus for producing emulsions shown in FIGS. 8 and 9, it is necessary to linearly form the microchannels on the periphery of the opening which is provided in the center part of the base. The number of microchannels per a base is at most 5000 in a case of small microchannels. The number is further decreased as the size of the microchannels is increased. Therefore, it is not easy to disperse homogenous particles of the dispersed phase into the continuous phase at high efficiency and as a result there is room for improvement with respect to the production cost.

SUMMARY OF THE INVENTION

To solve the above-mentioned problems, according to the present invention, there is provided a method for manufacturing microspheres comprising the steps of separating a dispersed phase and a continuous phase by a bulkhead in which a penetrating hole is formed, applying higher pressure to the dispersed phase than the continuous phase, and thereby pumping the dispersed phase into the continuous phase, wherein a non-uniform shear stress is made to act toward the boundary surface of the dispersed phase which is pumped into the continuous phase through the penetrating hole, so that microspheres are formed.

When the non-uniform shear stress acts toward the boundary surface of the dispersed phase which is pumped into the continuous phase through the penetrating hole, the dispersed phase is easy to separate and form into microspheres, so that microspheres having a uniform particle diameter can be manufactured.

This can be achieved by making the cross-sectional shape of the penetrating hole a slot shape or the like which is not a perfect square or circle in shape. By doing so, when the dispersed phase is pumped from the penetrating hole, the force, which is perpendicular to the boundary surface and acts in the direction from the outside to the inside, has a distribution in magnitude, so that the boundary surface between the continuous phase and the dispersed phase is unstable, the shear to the boundary surface is promoted, and thereby fine and homogenous microspheres can be produced.

In a case directed to emulsions as microspheres, liquid is used as a dispersed phase and a continuous phase. In a case directed to spray drying, liquid is used as a dispersed phase and air is used as a continuous phase.

Further, the amount of microspheres produced can be controlled by the supply pressure driving the dispersed phase. The supply pressure driving the dispersed phase at which the amount of microspheres produced is maximized in the range of stably producing microspheres is detected, and the operation is conducted at such pressure.

In order to stably produce microspheres, it is required to move and supply the continuous phase existing around the boundary surface to the boundary surface at the time of shearing the boundary surface. Therefore, it is necessary that the continuous phase exist around the boundary surface at a certain amount. Also, the continuous phase needs to be supplied so as to withdraw produced microspheres. The ratio of a dispersed phase in emulsions can be optionally determined by varying the flow velocity of the continuous phase. Therefore, the optimum flow velocity of the continuous phase which satisfies the above-mentioned conditions is detected, and the operation is conducted at such flow velocity.

By flowing the continuous phase at a predetermined velocity, not only the continuous phase can be supplied to the boundary surface, but also microspheres can be promoted to separate from the exit by supplying the continuous phase with mechanical force, such as ultrasonic or the like, which is applied to the continuous phase. Such external force has an effect not on shearing of liquid drops but of promoting separation after production (shearing).

As an example of the present invention can be listed an apparatus for implementing the above-mentioned method for manufacturing microspheres. In this example, a first plate, an intermediate plate and a second plate are provided apart from each other in a case. A first flow path, from which liquid cannot escape and through which a dispersed phase flows, is provided between the first plate and the intermediate plate. A second flow path, from which liquid cannot escape and through which a continuous phase and a phase containing microspheres flow, is provided between the intermediate plate and the second plate. A number of penetrating holes which connect the first flow path and the second flow path are formed in the intermediate plate. The penetrating holes have a non-circular shape which results in non-uniform shear stress acting toward the boundary surface of the dispersed phase which is pumped therethrough into the continuous phase.

With this structure, it is possible to greatly increase the number of the penetrating holes per an intermediate plate (for example, $1000/cm^2$ or more), and thereby mass-production of microspheres can be achieved.

A number of units each of which comprises the first plate, the intermediate plate and the second plate may be combined in a vertically extending array, and thereby high productivity can be achieved.

The opening shape of the penetrating holes formed in the intermediate plate may be a slot shape or a shape in which slots are combined. However, it is not limited to these shapes.

As a method for forming the penetrating hole in the intermediate plate, it is preferable to use an etching treatment, irradiation of electron rays, a precision processing technique such as a CVD method or the like, or a high-density plasma etching treatment which is one among dry etching treatments.

Further, by making at least one part of the first plate or the second plate transparent, it is possible to monitor the condition of producing microspheres from outside the apparatus with a CCD camera or the like.

DETAILED DESCRIPTION OF THE PREFERRED EMBODIMENTS

Hereinafter, a detailed explanation of the preferred embodiments according to the present invention will be given making reference to the attached drawings.

Figure 1:
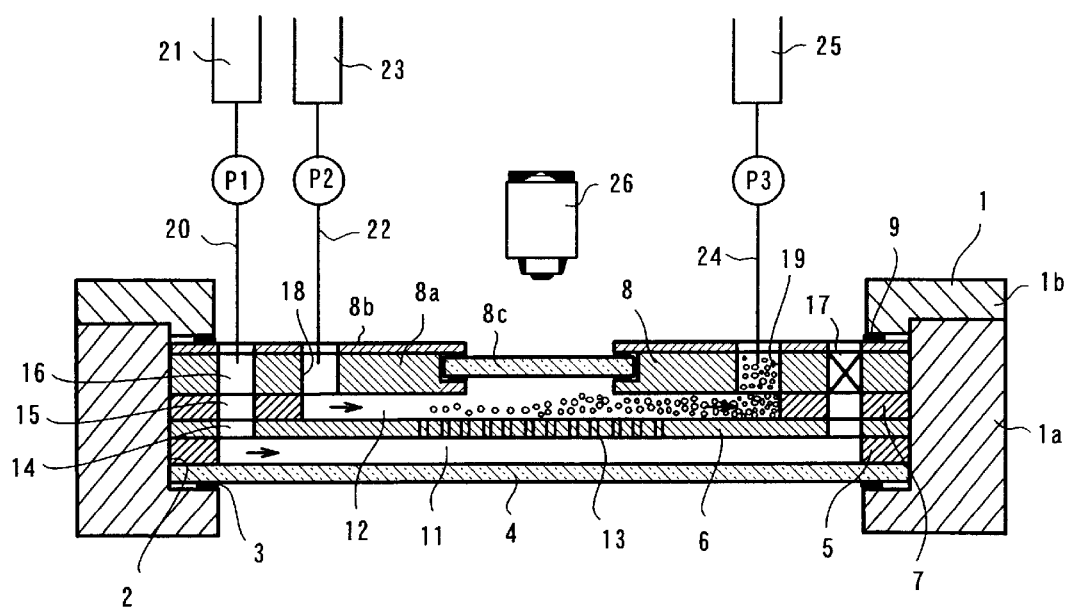
FIG. 1 is a sectional view of an a first embodiment of apparatus for manufacturing microspheres according to the present invention.

As shown in FIG. 1, a first embodiment of the apparatus for manufacturing microspheres according to the present invention comprises an annular case 1 in which plural plates and spacers are installed.

Specifically, the case 1 comprises the lower body 1a and the upper body 1b. A seal ring 3, a first plate 4 which is comprised of a transparent plate such as a glass plate or a plastic plate, an annular spacer 5 which is comprised of an elastic body, an intermediate plate or bulkhead member 6 which is comprised of a silicon substrate or the like, an annular spacer 7, a second plate 8 and a seal ring 9 are inserted in this order into a concave portion 2 formed in the lower body 1a. The upper body 1b is superposed thereon. Further, the upper body 1b is attached to the lower body 1a with bolts or the like.

A first flow path 11 from which liquid cannot escape is formed by the annular spacer 5 between the first plate 4 and the intermediate plate 6, and a dispersed phase flows therethrough. A second flow path 12 from which liquid cannot escape is formed by the annular spacer 7 between the second plate 8 and the intermediate plate 6, and a continuous phase and emulsions flow therethrough.

As shown in FIGS. 2–5, a number of penetrating holes 13 are provided at the substantial center of the intermediate plate 6. These penetrating holes 13 are formed, for example, by a plasma etching treatment using excited fluorine compound gas as reactive gas. The opening portion of each penetrating hole has a slot shape of 9.5 $\mu$m in width (T1) and 23.6 $\mu$m in length (T2). However, the size of the penetrating hole 13 is not limited to these values and may be optionally determined.

In order to form fine and homogenous microspheres it is preferable that the shape of the opening portion of the penetrating hole is not a perfect square or circle. For example, as shown in FIGS. 6(a)–6(e), an L-shape, a T-shape, a cross shape, an H-shape or a shape formed by inserting a wire into a cylinder is preferable.

Figure 2:
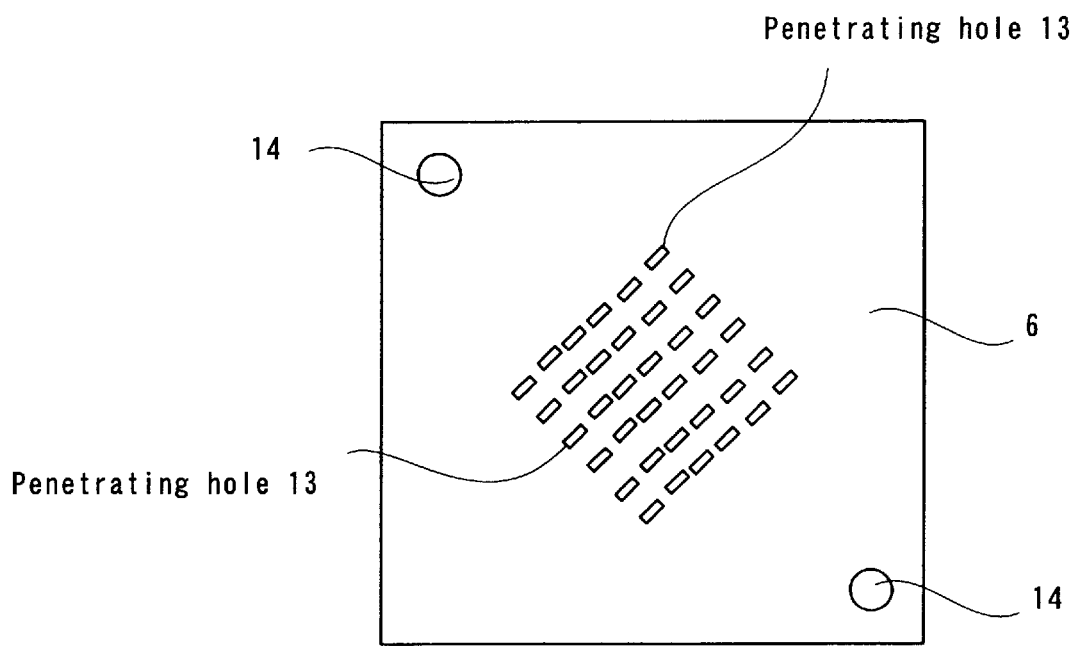
FIG. 2 is a plane view of an intermediate plate according to the present invention.
Figure 3:
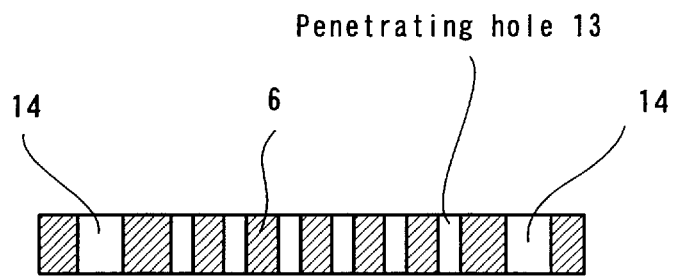
FIG. 3 is a sectional view of an intermediate plate according to the present invention.
Figure 4:
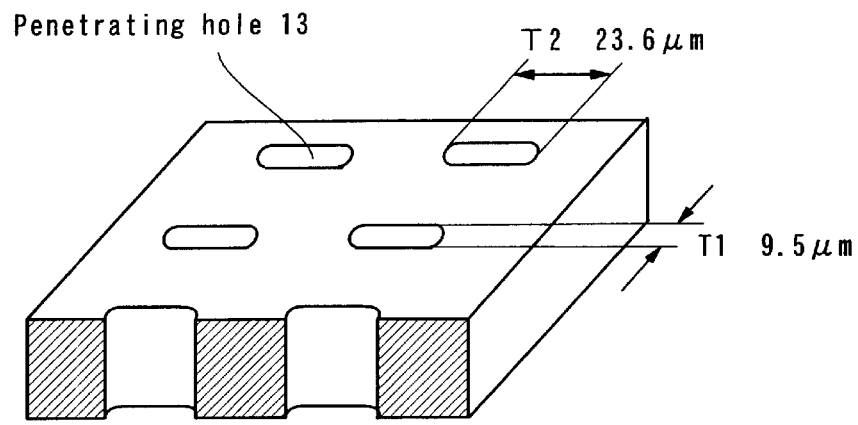
FIG. 4 is an enlarged, cut-away perspective view of one part of an intermediate plate according to the present invention (before the production of microspheres)

As shown in FIG. 2, openings 14 are formed at opposite corners of the intermediate plate 6. Openings 15 and 16 are respectively formed in the annular spacer 7 and the second plate 8, as shown in FIG. 1, to coincide with the openings 14. Flow paths for introducing a dispersed phase are formed by the openings 14, 15 and 16. In the present apparatus, one of the two flow paths for introducing a dispersed phase is blocked with a stopper 17.

Further, other openings 18 and 19 are formed in the second plate 8. The opening 18 is used as a flow path for introducing a continuous phase and the opening 19 is used as a flow path for withdrawing emulsions.

A reservoir for a dispersed phase 21 is connected to the opening 16 by a pipe 20 and a pump P1. A reservoir for a continuous phase 23 is connected to the opening 18 by a pipe 22 and a pump P2. A reservoir for emulsions 25 is connected to the opening 19 by a pipe 24 and a pump P3. Each pipe is connected to each opening via a joint (not shown) so that liquid cannot escape.

The second plate 8 comprises two plate materials 8a and 8b. A window portion is formed at the center of the plate materials 8a and 8b. A transparent plate 8c comprised of a glass plate or a plastic plate is supported with a seal in the window portion. With this structure, it is possible to monitor from outside whether or not microspheres are produced normally in the second flow path 12 by an optical reading device 26 such as a CCD camera or the like. It is also possible to accurately control the production velocity of microspheres depending on variation in the driving pressure.

Figure 7:
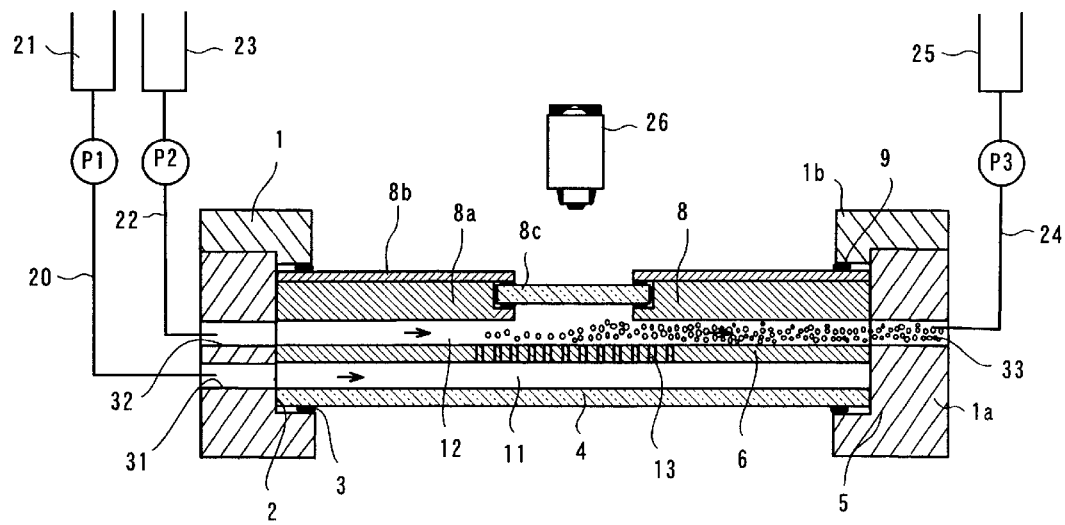
FIG. 7 is a sectional view of another embodiment of an apparatus for manufacturing microspheres according to the present invention.

In another embodiment of an apparatus for forming microspheres according to the invention as shown in FIG. 7, no opening is formed in the intermediate plate 6 and the second plate 8. Instead, a flow path 31 for introducing (withdrawing) a dispersed phase, a flow path 32 for introducing (withdrawing) a continuous phase and a flow path 33 for withdrawing (supplying) emulsions are formed in the case 1. Other than the locations of such openings and flow paths, this embodiment is structurally and functionally the same as the first embodiment.

For manufacturing microspheres with the apparatus of the first embodiment, the dispersed phase within the reservoir 21 is supplied to the first flow path 11 through the pump P1 and the pipe 20 at a predetermined pressure, and at the same time, the continuous phase within the reservoir 23 is supplied to the second flow path 12 through the pump P2 and the pipe 22 at a predetermined pressure.

Figure 5:
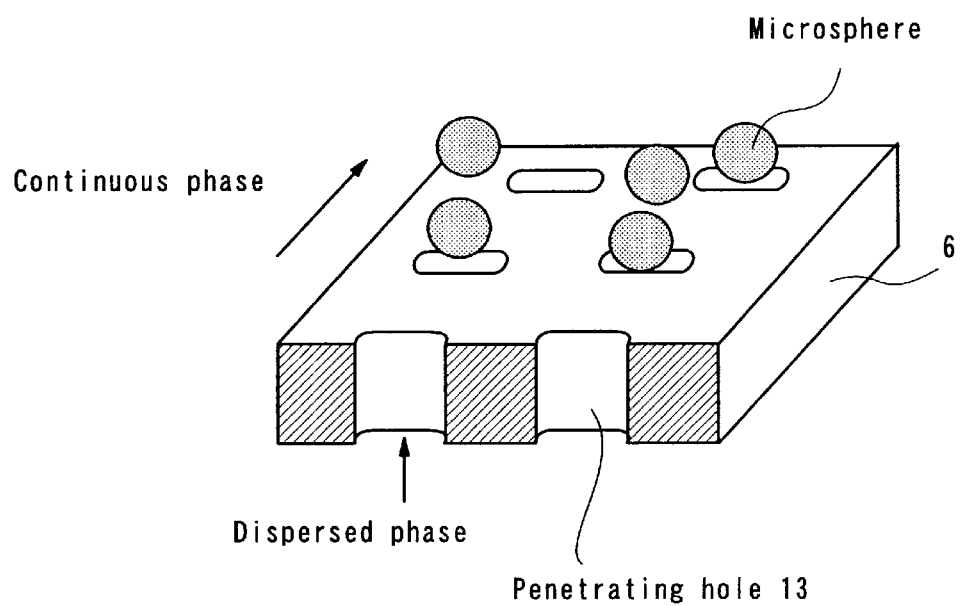
FIG. 5 is an enlarged cut-away perspective view of one part of an intermediate plate according to the present invention (showing the production of microspheres)
Figure 6:
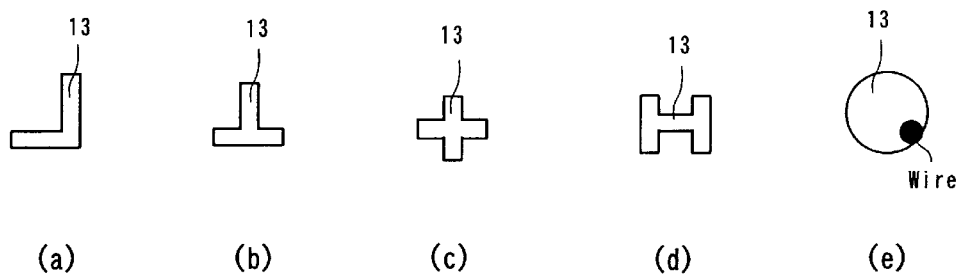
FIGS. 6(a)–6(e) show other embodiments of a penetrating hole according to the present invention.

Then, as shown in FIG. 5, the dispersed phase within the first flow path 11 passes through the penetrating holes 13 of the intermediated plate 6 and is dispersed as microspheres into the continuous phase, so that emulsions are formed. The emulsions are withdrawn to the reservoir 25 through the pipe 24 and the pump P3.

According to the present invention, the shape of the penetrating hole 13 is not a square or circular shape. Therefore, when the dispersed phase is pumped from the penetrating hole, the force, which is perpendicular to the boundary surface and acts in the direction from the outside to the inside, has a distribution in the magnitude thereof, so that the boundary surface between the continuous phase and the dispersed phase is unstable, the shear to the boundary surface is promoted, and thereby fine and homogenous microspheres can be produced.

The production velocity or rate of microspheres can be adjusted by controlling the flow velocity of the dispersed phase within the first flow path 11 or the flow velocity of the continuous phase within the second flow path 12.

It is also possible to vary the type of microspheres to be manufactured depending on the intermediate plate (hydrophilic or hydrophobic). In a case where a hydrophilic plate is used, microspheres of an oil-in-water type (O/W) can be manufactured. On the other hand, in a case where a hydrophobic plate is used, microspheres of a water-in-oil type (W/O) can be manufactured.

Hereinafter, an explanation of some embodiment examples will be given in detail.

EXAMPLE 1

Soybean oil was used as a dispersed phase and water containing sodium dodecyl sulfate of 0.3 wt % was used as a continuous phase. The driving pressure was set at 0.90 kPa and 1.80 kPa. The flow rate of the continuous phase was adjusted at 10 ml/h. Applying these conditions, the production of microspheres was attempted.

When the driving pressure was at 0.90 kPa, the dispersed phase could not be pumped into the continuous phase, and thereby microspheres could not be manufactured. However, when the driving pressure was increased to 1.80 kPa, the dispersed phase could be pumped into the continuous phase through the penetrating holes and microspheres were manufactured.

Microspheres manufactured in such a case were homogenous, having an extremely uniform particle diameter. It turned out that the reason is as follows:

Since the cross-sectional shape of the penetrating hole is a slot shape, when the dispersed phase passes through the penetrating holes, the boundary surface between the dispersed phase and the continuous phase which exists at the surface of the membrane or intermediate plate 6 is deformed due to the cross-sectional shape of the penetrating hole. The deformation causes a distribution in the strength of the force which is perpendicular to the boundary surface and acts in the direction from the outside to the inside, so that the condition of the boundary surface is made unstable and the shear to the boundary surface is promoted.

It is observed that the penetrating type microchannels having the cross-sectional shape which contributes to the deformation of the boundary surface, such as a slot shape or the like, are effective in manufacturing microspheres having a uniform size.

Also, it was observed that the manufactured microspheres have the same size and the same distribution in the size even if the driving pressure is varied to 12 kPa and the flow rate of the continuous phase is varied to 200 ml/h. In such a case, the maximum velocity or rate of manufacturing microspheres is around 100 pieces/second per each microchannel. This corresponds to microspheres being manufactured at a high rate of 125 ml/h maximum per a base assembly.

Figure 8:
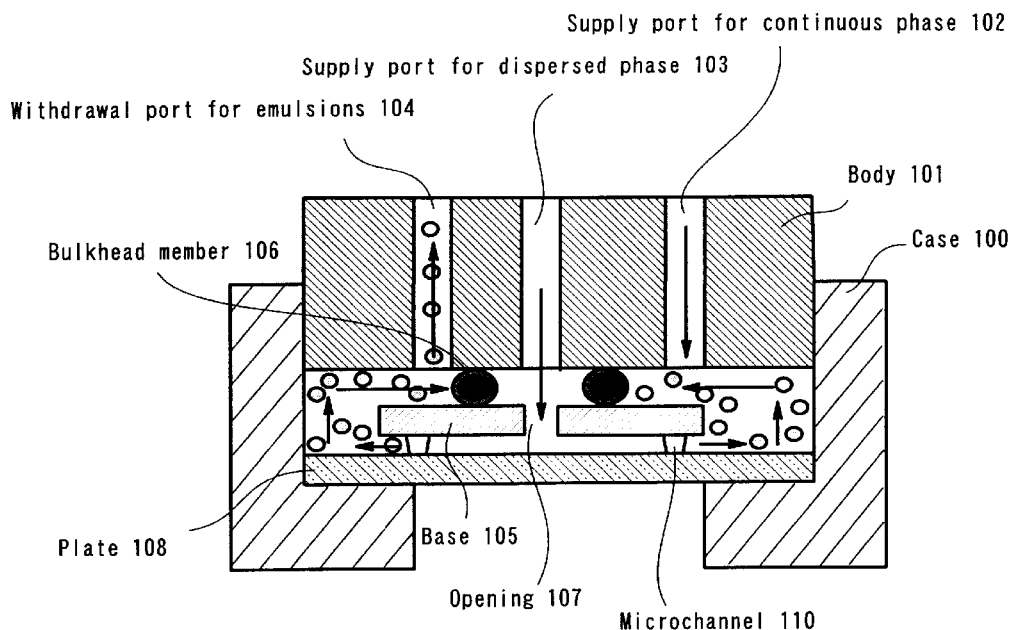
FIG. 8 is a sectional view of a conventional apparatus.
Figure 9:
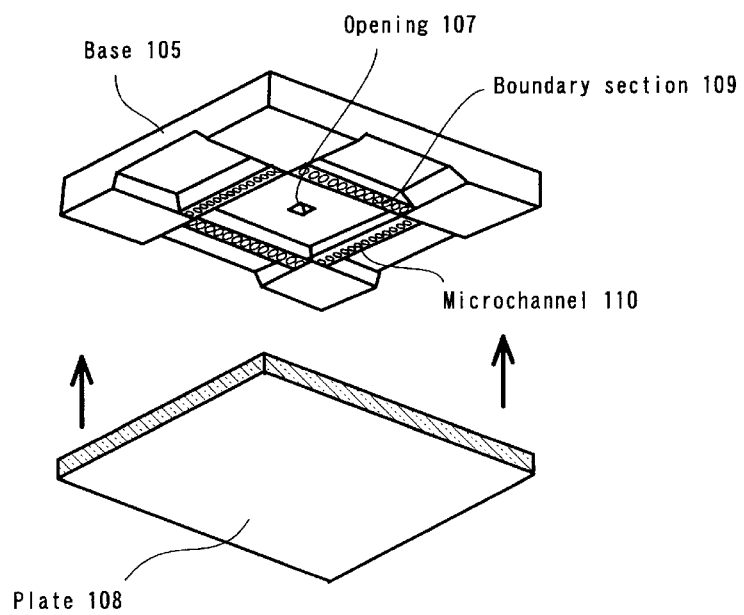
FIG. 9 is a perspective view showing the relationship between the base and the transparent plate used in the conventional apparatus.

On the other hand, in a case of using another penetrating type microchannel having a circular cross-sectional shape, the condition of the boundary surface between the dispersed phase and the continuous phase which exists at the surface of the membrane is stable and the shear to the boundary surface is difficult to promote. As a result, microspheres of a large size are manufactured. In addition, the penetrating type microchannel having a circular cross-sectional shape is inferior to the penetrating type microchannel having a slot-like cross-sectional shape in the size distribution of microspheres obtained thereby, and it is greatly influenced by the flow rate of the continuous phase. However, it can produce a high rate of output of emulsions compared to the conventional apparatus shown in FIGS. 8, 9.

The manufacture of microspheres according to the present invention is not limited to the production of emulsions. It can be utilized for many purposes. Hereinafter, some examples will be given.

The Manufacture of a Chromatography Carrier

With the method according to the present invention, high-grade silicate of soda is uniformly dispersed into toluene containing a surface-active agent. Gelation is caused by injecting carbonic acid gas into the dispersed liquid (emulsions), and thereafter, solid and liquid are separated. The solid portion (fine particles) is immersed in hydrochloric acid, dehydrated after cleaning with distilled water, dried at 180° C., fired at 550° C., and the surface-active agent is removed therefrom. Next, it is again immersed in hydrochloric acid and cleaned with water, and thereby high-grade silica particles are obtained. In order to prepare ODS (dimethyloctadecylmonochlorosilane) particles silica, ODS is added into the obtained high-grade silica particles within toluene, a reaction is caused, and thereby ODS silica particles are obtained.

In addition, the present invention can be applied to the manufacture of polymer toner, pigment, a conductive spacer, metallic paint, particles for cleaning the environment, a flame retardant, a catalyst, a heat-storage agent, an anti-bacterial agent, pheromone, edible oil, physiological activation substances, an enzyme, aluminum flakes, Micanite, fertilizer, a biodegradable microcapsule, and so on.

For example, in a heating medium obtained by dispersing phase change substances into a microcapsule, it is possible to carry a large amount of heat with a small amount of a heating medium due to high latent heat of the phase change substances. In particular, it is possible to secure the flowability by confining the phase change substances within a microcapsule.

A microcapsule heating medium is a novel one. It is superior to ordinary liquid in the characteristics of heat transfer. The characteristics are effective in utilizing unused heat of a relatively low temperature such as heat discharged from an atomic power plant.

It is also possible to make a sheet or a film with a microcapsules. For example, perfume constituents are confined in a microcapsules of several $\mu$m and these are printed onto a substrate such as a phonecard or the like with an offset printing. The microcapsules are broken when printing surfaces are rubbed, and thereby perfume is emanated. The present invention can be applied to the manufacture of such functional inks.

Also, the present invention may be applied to the encapsulation of medicine, an electrophoresis display, or the like.

As is explained in the above, by a method for manufacturing microspheres according to the present invention, since the pressurized dispersed phase is pumped into the continuous phase through penetrating holes having a non-circular shape such as a slot shape, a shape in which slots are combined, or the like, the particle diameters of the dispersed phase are not distributed over a wide range in a case where the diameters are large, and thereby homogenous microspheres can be obtained.

Further, by an apparatus for manufacturing microspheres according to the present invention, homogenous microspheres can be efficiently manufactured.

For example, if the present invention is applied to the manufacture of mayonnaise, chocolate, margarine, fat spread, or the like, it is possible to obtain such substances which are difficult to separate even after preservation over a long period of time and which are made to be superior in texture by the fine and uniform dispersed phase particles. Although there have been described what are the present embodiments of the invention, it will be understood by persons skilled in the art that variations and modifications may be made thereto without departing from the gist, spirit, or essence of the invention. The scope of the invention is indicated by the appended claims, rather than by the foregoing, non-limiting description of present embodiments.

What is claimed is:

1. A method for manufacturing microspheres comprising the steps of:

separating a dispersed phase and a continuous phase by a bulkhead in which a penetrating hole is formed;

applying pressure to the dispersed phase which is higher than a pressure applied to the continuous phase so that the dispersed phase is pumped through the penetrating hole into the continuous phase, and wherein a non-uniform shear stress is made to act toward a boundary surface of the dispersed phase which is pumped into the continuous phase through said penetrating hole, so that microspheres of the dispersed phase are formed.

2. A method for manufacturing microspheres according to claim 1, wherein said dispersed phase and said continuous phase are liquid.

3. A method for manufacturing microspheres according to claim 1, wherein said dispersed phase is liquid and said continuous phase comprises air.

4. A method for manufacturing microspheres according to claim 1, wherein a rate of manufacture of said microspheres is maximized in a range of stably manufacturing said microspheres by controlling said pressure applied to the dispersed phase.

5. A method for manufacturing microspheres according to claim 1, wherein the continuous phase flows around the boundary surface of the dispersed phase at a desired amount, the microspheres enter the continuous phase to form emulsions, the emulsions are withdrawn and a ratio of the dispersed phase in the withdrawn emulsions is determined by controlling a flow velocity of the continuous phase.

6. An apparatus for manufacturing microspheres comprising:

a case;

a first plate, an intermediate plate and a second plate provided separate from each other in said case;

a first flow path, from which liquid cannot escape and through which a dispersed phase may flow, provided between said first plate and said intermediate plate;

a second flow path, from which liquid cannot escape and through which a continuous phase and a phase containing microspheres may flow, provided between said intermediate plate and said second plate; and a number of penetrating holes, which connect said first flow path and said second flow path, formed in said intermediate plate, wherein said penetrating holes have a non-circular shape which enables the holes to make a non-uniform shear stress act toward a boundary surface of the dispersed phase when the dispersed phase is pumped through the holes into the continuous phase.

7. An apparatus for manufacturing microspheres according to claim 6, wherein the non-circular shape of said penetrating holes formed in said intermediate plate is a slot shape or a shape in which slots are combined.

8. An apparatus for manufacturing microspheres according to claim 6, wherein a number of said penetrating holes formed in said intermediate plate is $1000/cm^2$ or more.

9. An apparatus for manufacturing microspheres according to claim 6, including a plurality of units each of which comprises said first plate, said intermediate plate and said second plate, wherein said units are combined in a vertically extending array.

10. An apparatus for manufacturing microspheres according to claim 6, wherein at least one part of said first plate or said second plate is transparent so that production of the microsphere can be monitored therethrough.

11. A method for forming microspheres according to claim 1, wherein said bulkhead has a plurality of said penetrating holes formed therein.

12. A method for forming microspheres according to claim 1, wherein said penetrating hole is non-circular in shape.

13. A method for forming microspheres according to claim 1, wherein said penetrating hole is shaped as a slot or a combination of slots.

14. A method for forming microspheres according to claim 11, wherein a number of penetrating holes formed in said bulkhead member is at least $1000/cm^2$.

15. A method for forming microspheres according to claim 1, including the further step of applying mechanical force to said continuous phase for promoting the microspheres to separate from the penetrating hole in the bulkhead.

16. An apparatus for manufacturing microspheres according to claim 6, further including means for applying mechanical force to said continuous phase for promoting the microspheres to separate from the penetrating hole in the bulkhead.

* * * * *

UNITED STATES PATENT AND TRADEMARK OFFICE
CERTIFICATE OF CORRECTION

PATENT NO.     : 6,576,023 B2
DATED          : June 10, 2003
INVENTOR(S)    : Mitsutoshi Nakajima et al.

It is certified that error appears in the above-identified patent and that said Letters Patent is hereby corrected as shown below:

Title page,
Item [56], References Cited, U.S. PATENT DOCUMENTS,
change "4,201,691 A    5/1980 Louderback" to -- 4,201,691 A    5/1980 Asher et al. --;
change "5,626,751 A *  5/1997 Kikuchi et al." to -- 5,626,751 A  5/1997 Kikuchi et al. --;
change "6,155,710 A *  12/2000 Nakajima et al." to -- 6,155,710 A 12/2000 Nakajima et al. --.
FOREIGN PATENT DOCUMENTS,
change "JP      2-954433 A    4/1990" to -- JP       2-95433 A     4/1990 --;
change "WO     WO97/30783  * 8/1997" to -- WO      WO97/30783   8/1997 --.
OTHER PUBLICATIONS,
change "Formation In Liquid-Liuid System", *Kagaku Kogaku*, vol." to -- Formation In Liquid-Liquid System", *Kagaku Kogaku*, vol. --;
change "Poulos: "Preparation Of Liposomes of Defined Size Distri-" to -- poulos: "Preparation Of Liposomes Of Defined Size Distri- --;
change "Cell Creation In Microchannel Eulsification By Visual" to -- Cell Creation In Microchannel Emulsification By Visual --.

Column 2,
Line 15, change "continuous phase are mixed in a microchannels 110 formed" to
-- continuous phase are mixed in microchannels 110 formed --.
Line 63, change "In the known apparatus in relation to, as well as particle" to -- In the known apparatus, as well as in relation to particle --.

Column 4,
Line 45, change "FIG. 1 is a sectional view of an a first embodiment of" to -- FIG. 1 is a sectional view of a first embodiment of an --.

Column 6,
Line 26, change "the intermediated plate 6 and is dispersed as microspheres" to -- the intermediate plate 6 and is dispersed as microspheres --.

Column 7,
Line 60, change "(dimethyloctadecylmonochlorosilane) particles silica, ODS" to
-- (dimethyloctadecylmonochlorosilane) silica particles, ODS --.

UNITED STATES PATENT AND TRADEMARK OFFICE
CERTIFICATE OF CORRECTION

PATENT NO. : 6,576,023 B2
DATED : June 10, 2003
INVENTOR(S) : Mitsutoshi Nakajima et al.

It is certified that error appears in the above-identified patent and that said Letters Patent is hereby corrected as shown below:

<u>Column 8,</u>
Line 16, change "It is also possible to make a sheet or a film with a" to -- It is also possible to make a sheet or a film with --.
Line 18, change "fined in a microcapsules of several $\mu$m and these are printed" to -- fined in microcapsules of several $\mu$m and these are printed --.
Line 20, change "printing. The microcapsules are broken when printing sur-" to -- printing. The microcapsules are broken when their printing sur- --.

Signed and Sealed this

Fourteenth Day of October, 2003

JAMES E. ROGAN
*Director of the United States Patent and Trademark Office*